US009865151B2

(12) United States Patent
Takeda

(10) Patent No.: US 9,865,151 B2
(45) Date of Patent: Jan. 9, 2018

(54) OBSERVATION SYSTEM AND METHOD FOR CONTROLLING OBSERVATION SYSTEM

(71) Applicant: SEIKO EPSON CORPORATION, Tokyo (JP)

(72) Inventor: Kazuyoshi Takeda, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/451,746

(22) Filed: Mar. 7, 2017

(65) Prior Publication Data

US 2017/0287308 A1    Oct. 5, 2017

(30) Foreign Application Priority Data

Mar. 29, 2016  (JP) ................................. 2016-065224

(51) Int. Cl.
| | |
|---|---|
| *G08B 21/10* | (2006.01) |
| *H04Q 9/02* | (2006.01) |
| *H04W 4/00* | (2009.01) |
| *G08B 31/00* | (2006.01) |

(52) U.S. Cl.
CPC ............ *G08B 21/10* (2013.01); *G08B 31/00* (2013.01); *H04Q 9/02* (2013.01); *H04W 4/005* (2013.01); *H04Q 2209/40* (2013.01); *H04Q 2209/823* (2013.01); *H04Q 2209/886* (2013.01)

(58) Field of Classification Search
CPC ........ G08B 21/10; G08B 29/02; G08B 7/066; G08B 25/001
See application file for complete search history.

(56) References Cited

U.S. PATENT DOCUMENTS

| | | | | |
|---|---|---|---|---|
| 2007/0204291 A1* | 8/2007 | Ichihashi | ............. | H04N 5/4401 725/33 |
| 2009/0243845 A1* | 10/2009 | Kagawa | ................. | G08B 7/066 340/540 |
| 2013/0085729 A1 | 4/2013 | Tsuruta et al. | | |

FOREIGN PATENT DOCUMENTS

| | | |
|---|---|---|
| JP | 2003-346271 A | 12/2003 |
| JP | 2012-089749 A | 5/2012 |
| JP | 2013-073537 A | 4/2013 |
| JP | 2017-182248 A | 10/2017 |

OTHER PUBLICATIONS

"Disaster Occurrence Risk Prediction Thecnology (Soil Disaster) Utilizing Rainfall Information," May 24, 2013, pp. 1-25.

* cited by examiner

*Primary Examiner* — Kabir A Timory
(74) *Attorney, Agent, or Firm* — Oliff PLC

(57) ABSTRACT

An observation system includes: a power supply unit having a battery; a sensor unit which detects a state of a structure on the basis of electricity from the power supply unit; a charging unit which charges the battery from renewable energy; and a processing unit which processes sensing information in one observation mode of a plurality of observation modes including at least a first observation mode and a second observation mode in which at least one of a sensor capability of the sensor unit and a load of computational processing using the sensing information is higher than in the first observation mode. The processing unit sets an observation mode on the basis of information for disaster occurrence estimation.

18 Claims, 11 Drawing Sheets

| STARTING TIME AND DATE | OBSERVATION MODE |
|---|---|
| CURRENT TIME | B |
| MONTH $M_1$, DAY $D_1$, HOUR $h_1$, MINUTE $m_1$ | C |
| MONTH $M_2$, DAY $D_2$, HOUR $h_2$, MINUTE $m_2$ | D |

FIG. 9

| STARTING TIME AND DATE | OBSERVATION MODE |
|---|---|
| CURRENT TIME | CHANGE TO A |
| CHANGE TO MONTH $M_3$, DAY $D_3$, HOUR $h_3$, MINUTE $m_3$ C | C |
| MONTH $M_2$, DAY $D_2$, HOUR $h_2$, MINUTE $m_2$ | D |

FIG. 10

| OBSERVATION MODE | A | B | C | D |
|---|---|---|---|---|
| DETERMINATION BASED ON INFORMATION FOR DISASTER OCCURRENCE ESTIMATION AND INFORMATION OF AMOUNT OF REMAINING ELECTRICITY | STATE WHERE PROBABILITY OF DISASTER OCCURRENCE IS LOW AND REMAINING CAPACITY OF STORAGE BATTERY HAS RUN OUT OR CASE WHERE PROBABILITY OF DISASTER OCCURRENCE IS PREDICTED TO BE HIGHER (ROUGH WEATHER) SHORTLY AND THEREFORE REMAINING CAPACITY OF STORAGE BATTERY URGENTLY NEEDS TO BE INCREASED BEFORE THAT | STATE WHERE PROBABILITY OF DISASTER OCCURRENCE IS LOW AND REMAINING CAPACITY OF STORAGE BATTERY IS NOT ENOUGH OR CASE WHERE PROBABILITY OF DISASTER OCCURRENCE IS PREDICTED TO BE HIGHER (ROUGH WEATHER) SHORTLY BUT IT IS DETERMINED THAT SUFFICIENT CAPACITY OF STORAGE BATTERY CAN BE SECURED IN THIS MODE BY THAT TIME | NORMAL MODE IN STATE WHERE REMAINING CAPACITY OF STORAGE BATTERY IS SUFFICIENT AND IN STATE WHERE PROBABILITY OF DISASTER OCCURRENCE IS HIGH | STATE WHERE PROBABILITY OF DISASTER OCCURRENCE IS VERY HIGH |
| PROCESSING OUTLINE | GIVE PRIORITY TO REDUCTION OF ELECTRICITY CONSUMPTION AND CARRY OUT MINIMUM MEASUREMENT | MODE WHERE ELECTRICITY CONSUMPTION IS LOW OF NORMAL MODES; CARRY OUT RELATIVELY INDEPENDENT MEASUREMENT AND DETERMINATION WHILE RESTRAINING ELECTRICITY CONSUMPTION | MODE WHERE ELECTRICITY CONSUMPTION IS HIGH OF NORMAL MODES; CARRY OUT NECESSARY AND SUFFICIENT PROCESSING IN STATE WHERE REMAINING CAPACITY OF STORAGE BATTERY IS RELATIVELY SUFFICIENT | GIVE PRIORITY TO MEASUREMENT FOR DISASTER OCCURRENCE PREDICTION, AND CAUSE ALL MEASURING FUNCTIONS TO OPERATE TO MAXIMUM |
| ELECTRICITY CONSUMPTION | SMALLEST | SMALL | LARGE | LARGEST |
| NUMBER (TYPES) OF DRIVEN SENSORS | TILT SENSOR | TILT SENSOR | TILT SENSOR, VIBRATION SENSOR, WATER LEVEL SENSOR | TILT SENSOR, VIBRATION SENSOR, WATER LEVEL SENSOR, IMAGE PICKUP SENSOR |
| SAMPLING CYCLE | TILT SENSOR: ONCE PER HOUR | TILT SENSOR: ONCE PER MINUTE | TILT SENSOR : 10sps<br>VIBRATION SENSOR : 100sps<br>WATER LEVEL SENSOR : 10sps | TILT SENSOR : 10sps<br>VIBRATION SENSOR : 100sps<br>WATER LEVEL SENSOR : 10sps<br>IMAGE PICKUP SENSOR : 1sps |
| COMMUNICATION CYCLE OF COMMUNICATION UNIT | ONCE PER DAY | ONCE PER HOUR | ONCE PER MINUTE | ONCE PER SECOND |
| COMPUTATION FOR DETERMINATION | SIMPLIFIED TILT ANGLE DETERMINATION | TILT ANGLE TRANSITION PREDICTION AND TILT ANGLE DETERMINATION | TILT ANGLE TRANSITION PREDICTION AND TILT ANGLE DETERMINATION<br>VIBRATION INTENSITY AND FREQUENCY DISTRIBUTION ANALYSIS CHARACTERISTICS EXTRACTION AND DETERMINATION<br>WATER LEVEL TRANSITION PREDICTION AND DETERMINATION<br>INTEGRATED DISASTER (SLOPE FALLING DOWN) PREDICTION | TILT ANGLE TRANSITION PREDICTION AND TILT ANGLE DETERMINATION<br>VIBRATION INTENSITY AND FREQUENCY DISTRIBUTION ANALYSIS CHARACTERISTICS EXTRACTION AND DETERMINATION<br>WATER LEVEL PREDICTION AND DETERMINATION<br>INTEGRATED DISASTER (SLOPE FALLING DOWN) PREDICTION |

FIG. 12

OBSERVATION SYSTEM AND METHOD FOR CONTROLLING OBSERVATION SYSTEM

BACKGROUND

1. Technical Field

The present invention relates to an observation system and a method for controlling an observation system or the like.

2. Related Art

According to the related art, an observation system which carries out detection of the state of a structure (abnormality detection and monitoring) using various sensors is known. The structure in this case may be an artificial structure such as a building, bridge or slope, and may also be a natural structure such as a natural slope. By detecting the state of a structure, it is possible to restrain the structure from collapsing or falling down and to restrain damage from spreading in the case where the structure has collapsed or the like.

It is desirable that the state of the structure is detected by an independent measurement system. This is because, if an independent configuration is not used, a cable for power supply and communication with an external device is needed, thus increasing the burden at the time of installation, and if the cable is disconnected or the like, the result of measurement cannot be outputted to the external device. Thus, electricity based on renewable energy such as sunlight should be used for driving the sensors for state detection and for computational processing based on sensor information.

JP-A-2003-346271 discloses a technique in which a measurement and communication device having a renewable energy-based power generator and a storage battery and periodically communicating measurement data measured by a sensor monitors the amount of electricity generated and thus predicts the amount of electricity generated and controls the measurement interval and the communication interval in consideration of the amount of electricity stored. JP-A-2013-73537 discloses a system which estimates the amount of electricity generated by photovoltaic power generation on the basis of weather forecast.

An abnormality in a structure is likely to occur when the weather is rough. That is, the detection of the state of a structure using an independent observation system needs to be carried out with high accuracy and high frequency when the weather is rough. However, the amount of electricity generated by photovoltaic panels is very small when the weather is rough. Therefore, even if electricity for measurement and communication is controlled on the basis of the prediction of the amount of electricity generated as in the related-art technique, it may be impossible to measure the amount of electricity generated, due to power shortage, when the weather is rough over a long period.

SUMMARY

An advantage of some aspects of the invention is to provide an observation system which operates in a proper mode corresponding to the circumstances when independently detecting the state of a structure, and a method for controlling an observation system or the like.

An aspect of the invention relates to an observation system including: a power supply unit having a battery; a sensor unit which detects a state of a structure on the basis of electricity from the power supply unit; a charging unit which charges the battery from renewable energy; and a processing unit which processes sensing information detected by the sensor unit in one observation mode of a plurality of observation modes including at least a first observation mode and a second observation mode in which at least one of a sensor capability of the sensor unit and a load of computational processing using the sensing information from the sensor unit is higher than in the first observation mode. The processing unit acquires information for disaster occurrence estimation and performs control such that the first observation mode is set if it is determined that a probability of disaster occurrence is below a first value on the basis of the information for disaster occurrence estimation that is acquired, whereas the second observation mode is set if it is determined that the probability of disaster occurrence is above a second value that is equal to or above the first value.

According to the aspect of the invention, in the case of detecting the state of a structure using the independent observation system which can be charged with electricity from renewable energy, operations in a plurality of observation modes are enabled and the sensor capability and the computational processing load are changed according to the observation mode used. Moreover, the processing unit controls the setting of an observation mode on the basis of information for disaster occurrence estimation. This enables the setting of an observation mode corresponding to the probability of disaster occurrence and an operation suitable for the observation mode, and therefore enables the detection of the state of the structure in consideration of electricity consumption and the frequency and accuracy of measurement.

In the observation system according to the aspect, the sensor unit may include a plurality of sensors, and the processing unit may enhance the sensor capability by increasing a number of sensors that are made to operate, of the plurality of sensors.

This enables the sensor capability to be controlled according to the number of sensors that are made to operate.

In the observation system according to the aspect of the invention, the processing unit may enhance the sensor capability by increasing an operation rate of a sensor included in the sensor unit.

This enables the sensor capability to be controlled according to the operation rate of the sensor.

Another aspect of the invention relates to an observation system including: a power supply unit having a plurality of batteries; a sensor unit which detects a state of a structure on the basis of electricity from the power supply unit; a charging unit which charges at least one battery of the plurality of batteries from renewable energy; and a processing unit which processes sensing information detected by the sensor unit in one observation mode of a plurality of observation modes including at least a first observation mode and a second observation mode in which a battery that is not used in the first observation mode, of the plurality of batteries, is used. The processing unit acquires information for disaster occurrence estimation and performs control such that the first observation mode is set if it is determined that a probability of disaster occurrence is below a first value on the basis of the information for disaster occurrence estimation that is acquired, whereas the second observation mode is set if it is determined that the probability of disaster occurrence is above a second value that is equal to or above the first value.

According to the aspect of the invention, in the case of detecting the state of a structure using the independent observation system which can be charged with electricity from renewable energy, operations in a plurality of observation modes are enabled and the battery to be used is changed according to the observation mode used. Moreover, the processing unit controls the setting of an observation mode on the basis of information for disaster occurrence estimation. This enables the setting of an observation mode corresponding to the probability of disaster occurrence and the use of a battery suitable for the observation mode.

The observation system according to the aspect of the invention may have a communication unit capable of reception. The processing unit may acquire the information for disaster occurrence estimation received by the communication unit.

This enables the acquisition of the information for disaster occurrence estimation by communication.

In the observation system according to the aspect of the invention, the sensor unit may include a weather sensor, and the processing unit may acquire the information for disaster occurrence estimation by computation based on sensing information from the weather sensor.

This enables the acquisition of the information for disaster occurrence estimation on the basis of sensing information from the weather sensor.

In the observation system according to the aspect of the invention, the processing unit may set the observation mode on the basis of the information for disaster occurrence estimation and at least one of history information of the sensing information of the structure from the sensor unit and remaining electricity information of the power supply unit.

This enables the setting of a more proper observation mode, using both the history information of the sensing information and the remaining electricity information.

In the observation system according to the aspect of the invention, the processing unit may decide at least one of a timing of switching the observation mode and a timing of executing a switching determination on the observation mode, on the basis of the information for disaster occurrence estimation.

This enables flexible switching between observation modes on the basis of the information for disaster occurrence estimation.

The observation system according to the aspect of the invention may include a communication unit capable of transmission. The processing unit may set a higher rate of transmission of the sensing information by the communication unit to an outside in the second observation mode than in the first observation mode.

This enables the rate of transmission to the outside to be controlled according to the observation mode.

In the observation system according to the aspect of the invention, the sensor unit may include at least two sensors, from among a tilt sensor, a vibration sensor, a water level sensor, and an image pickup sensor.

This enables proper detection of the state, utilizing a combination of a plurality of sensors useful for the detection of the state of a structure.

Another aspect of the invention relates to a method for controlling an observation system including a power supply unit having a battery, a sensor unit which detects a state of a structure on the basis of electricity from the power supply unit, and a charging unit which charges the battery from renewable energy, at least a first observation mode and a second observation mode in which at least one of a sensor capability of the sensor unit and a load of computational processing using the sensing information from the sensor unit is higher than in the first observation mode are included as observation modes. The method includes acquiring information for disaster occurrence estimation, setting the first observation mode if it is determined that a probability of disaster occurrence is below a first value on the basis of the information for disaster occurrence estimation that is acquired, and setting the second observation mode if it is determined that the probability of disaster occurrence is above a second value that is equal to or above the first value.

Another aspect of the invention relates to a method for controlling an observation system including a power supply unit having a plurality of batteries, a sensor unit which detects a state of a structure on the basis of electricity from the power supply unit, and a charging unit which charges at least one battery of the plurality of batteries from renewable energy, at least a first observation mode and a second observation mode in which a battery that is not used in the first observation mode, of the plurality of batteries, is used, are included as observation modes. The method includes acquiring information for disaster occurrence estimation, setting the first observation mode if it is determined that a probability of disaster occurrence is below a first value on the basis of the information for disaster occurrence estimation that is acquired, and setting the second observation mode if it is determined that the probability of disaster occurrence is above a second value that is equal to or above the first value.

BRIEF DESCRIPTION OF THE DRAWINGS

The invention will be described with reference to the accompanying drawings, wherein like numbers reference like elements.

FIG. 9 shows an example of a schedule of observation modes.

FIG. 10 shows an example of a schedule of observation modes after rescheduling.

FIG. 12 shows a detailed example of operation in each observation mode.

DESCRIPTION OF EXEMPLARY EMBODIMENTS

Figure 1:
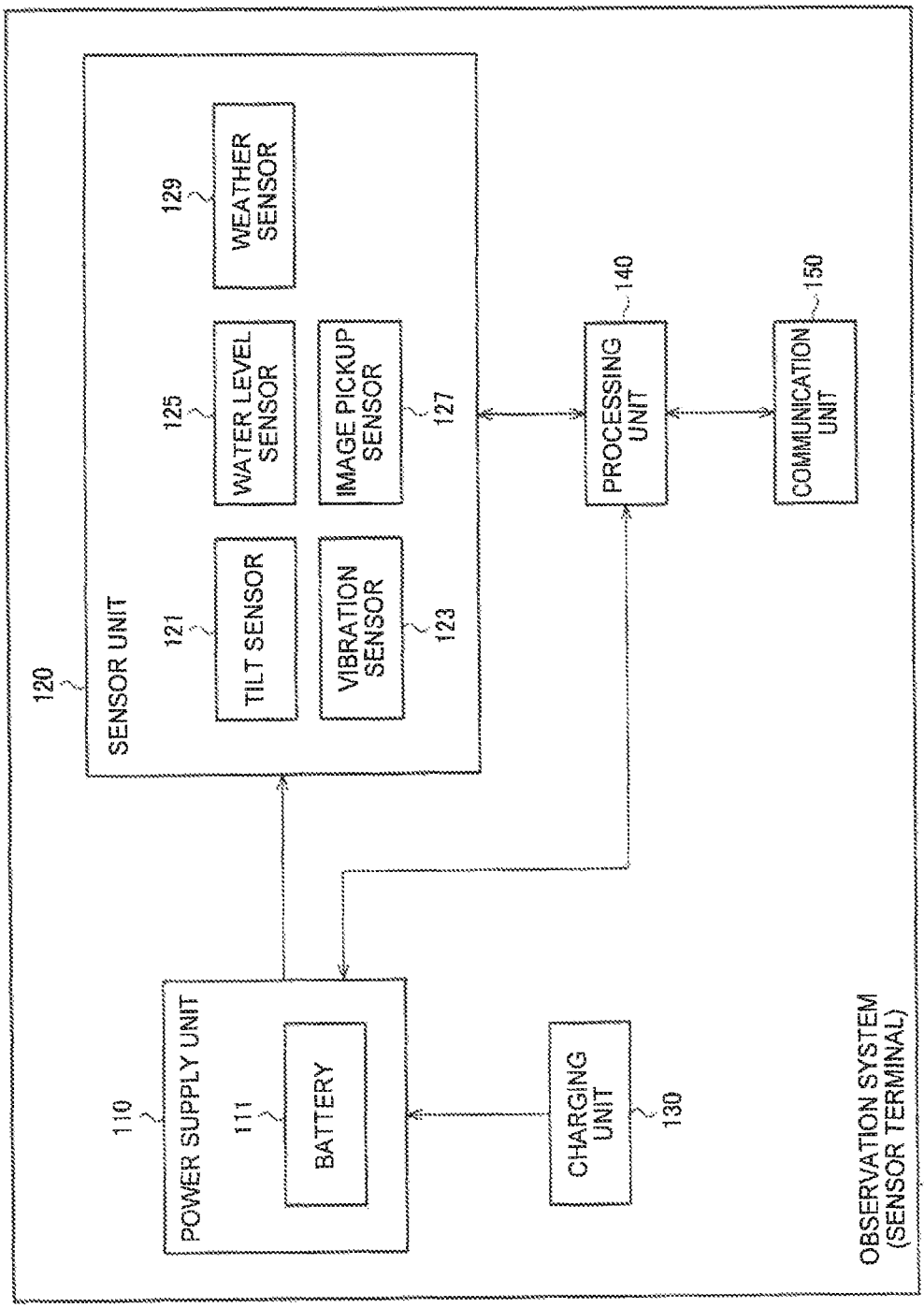
FIG. 1 shows an example of the configuration of an observation system.

An embodiment will be described below. The embodiment described below should not unduly limit the contents of the invention described in the appended claims. Also, not all the configurations described in the embodiment are necessarily essential components of the invention.

1. Technique According to Embodiment

First, a technique according to the embodiment will be described. As described above, it is desirable that a system which detects the state of a structure uses an independent device. If an independent device is used, work for installing a cable or the like is not needed and there is no need to consider abnormalities of the cable. In a circumstance where an abnormality occurs in a structure, an abnormality such as disconnection can occur in the cable as well. Therefore, there is a risk of failure to supply electricity in a circumstance where measurement is needed, or a risk of an inability to output measured information to the outside. However, with an independent device, such risks need not be considered.

If a cable for power supply is not provided, the device for measurement has a built-in battery. If a battery which needs to be replaced or charged by the user is used as the battery in question, there is a heavy burden of maintenance on the user, which is not preferable. Therefore, a device which does not need power supply via a cable or charging by the user may be used. The use of renewable energy is conceivable. JP-A-2003-346271 discloses a technique using wind power generation. JP-A-2013-73537 discloses a technique using photovoltaic power generation. In the detection of the state of a structure, an abnormality in the structure that can occur at an unknown timing must be detected. Therefore, constant monitoring is important and the use of charging based on renewable energy is significantly advantageous in this respect.

However, even though constant monitoring is important, an observation system 100 need not operate constantly in the same mode. For example, in detecting the state of a structure, it may be possible to presume circumstances where an abnormality is likely or unlikely to occur in the structure. More specifically, in the case of monitoring the risk of landslide disaster such as falling down of a slope or natural slope, landslide disaster is more likely to occur when the weather is rough than when the weather is fine. Therefore, when the weather is rough, it is desirable that the frequency of sensing and the accuracy of detection processing are increased, compared with when the weather is fine.

Meanwhile, in the case of using sunlight as renewable energy, the amount of electricity generated is very small when the weather is rough. Therefore, if an independent observation system 100 using a photovoltaic panel is to be realized, it results in a conflicting state where the amount of electricity generated is small despite the very high need for observation (measurement by a sensor).

The technique of JP-A-2003-346271 is to control the measurement interval and the communication interval on the basis of the amount of electricity generated and the amount of electricity stored. The technique of JP-A-2013-73537 is to predict the amount of electricity generated, from weather information. That is, the related-art techniques only disclose the continuation of the measurement operation and the use of weather information for this purpose and do not disclose a technique for predicting the time when the need for the measurement is increased, and controlling electricity to enable an operation with high accuracy when the need for the measurement is increased. That is, the related-art techniques do not include a system which detects the state of a structure, using renewable energy. Even if the related-art techniques are applied to a system which detects the state of a structure, the system cannot realize an operation at a high frequency and with high accuracy when the weather is rough. In some cases, if the rough weather continues for a long period, there is a risk that measurement under rough weather itself cannot be carried out.

The observation system 100 according to the embodiment includes a power supply unit 110 having a battery 111, a sensor unit 120 which detects the state of a structure on the basis of electricity from the power supply unit 110, a charging unit 130 which charges the battery 111 from renewable energy, and a processing unit 140 which processes sensing information detected by the sensor unit 120 in one observation mode of a plurality of observation modes including at least a first observation mode and a second observation mode in which at least one of the sensor capability of the sensor unit and the load of computational processing using the sensing information from the sensor unit 120 is higher than in the first observation mode. The processing unit 140 acquires information for disaster occurrence estimation and performs control such that the first observation mode is set if it is determined that the probability of disaster occurrence is below a first value on the basis of the information for disaster occurrence estimation that is acquired, whereas the second observation mode is set if it is determined that the probability of disaster occurrence is above a second value that is equal to or above the first value, as shown in FIG. 1.

Here, the information for disaster occurrence estimation is information to estimate whether a disaster is likely to occur or not, for example, weather information that is described later. The probability of disaster occurrence is information indicating whether a disaster found on the basis of the information for disaster occurrence estimation is likely to occur or not. The probability of disaster occurrence is information that enables a determination on whether the probability is high or low, for example, numerical information. Alternatively, a plurality of zones with their boundaries defined by a first value and a second value may be set and the probability of disaster occurrence may be information that can specify one zone of the plurality of zones.

This enables the implementation of the observation system 100 which detects the state of a structure, using renewable energy, and which operates in a proper observation mode according to the circumstances. When controlling the sensor capability and the computational processing load, by restraining electricity consumption in an operation in a first observation mode, it is possible to secure electricity for an operation in a second observation mode, in which electricity consumption is relatively large. For example, it is possible to perform control such as operating in the first observation mode when the weather is fine before the weather turns rough, and thus restraining electricity consumption, in order to enable a detection operation at a high frequency or with high accuracy in the second observation mode when the weather is rough. That is, since electricity for the second observation mode can be secured, measurement at a high frequency and with high accuracy can be carried out in a circumstance where the need for measurement is high.

The first value and the second value may be equal in magnitude. That is, the processing unit 140 may perform control to set the first observation mode if the probability of disaster occurrence is below a predetermined threshold (=first value=second value), and may perform control to set the second observation mode if the probability of disaster occurrence is above the predetermined threshold. In this example, if the probability of disaster occurrence is equal to the predetermined threshold, the first observation mode or the second observation mode may be set.

In the embodiment, it suffices that the processing unit 140 can operate in at least two observation modes with different sensor capabilities and computational processing loads. There may be three or more observation modes. For example, in the above example, if the probability of disaster occurrence is equal to a predetermined threshold, the processing unit 140 may set a third observation mode that is different from both the first observation mode and the second observation mode. Alternatively, the first value and the second value may be different values, and the processing unit 140 may perform control such that the first observation is set if the probability of disaster occurrence is below the first value, the second observation is set if the probability of disaster occurrence is above the second value, and the third observation mode is set if the probability of disaster occurrence is a value between the first value and the second value. The third observation mode in this can be further subdivided as well.

Hereinafter, an example of the configuration of the observation system 100 according to the embodiment will be described. Then, a specific example of controlling observation modes will be described. Finally, several modifications will be described. First, an embodiment in which the sensor capability and the computational processing load are controlled will be described below, and an embodiment in which the setting of the battery is carried out will be described as a modification.

2. Example of System Configuration

An example of the configuration of the observation system 100 according to the embodiment is as shown in FIG. 1. The observation system 100 includes the power supply unit 110, the sensor unit 120, the charging unit 130, the processing unit 140, and a communication unit 150. However, the observation system 100 is not limited to the configuration shown in FIG. 1 and may be implemented with various modifications such as omitting apart of the components or adding another component.

The power supply unit 110 includes the battery 111. As described as a modification below, the power supply unit 110 may include a plurality of batteries as the battery 111 and change batteries to supply electricity to each part of the observation system 100 in response to information inputted from the processing unit 140. For example, the power supply unit 110 includes a battery for the first observation mode (first battery) and a battery for the second observation mode (second battery). When the processing unit 140 operates in the first observation mode, the first battery supplies power to each part of the observation system 100, whereas when the processing unit 140 operates in the second observation mode, the second battery supplies power to each part of the observation system 100.

The sensor unit 120 includes at least a sensor for detecting the state of a structure. The sensor for detecting the state of a structure may be a tilt sensor 121, a vibration sensor 123, a water level sensor 125, an image pickup sensor 127 or the like. However, the observation system 100 need not include all of the sensors shown in FIG. 1. A part of the sensors may be omitted and another sensor may be added.

The tilt sensor 121 detects a tilt of a structure where the sensor is installed. The vibration sensor 123 detects a vibration of the structure. The tilt sensor 121 and the vibration sensor 123 can be realized by an acceleration sensor, for example. Since the acceleration sensor detects gravitational acceleration, a tilt is detected by detecting a change in gravitational acceleration from an acceleration signal. Meanwhile, since a vibration appears as a fluctuation in acceleration, vibration intensity is detected from the magnitude of acceleration, and vibration frequency is detected from the frequency characteristic of acceleration (for example, the result of FFT (fast Fourier transform)). Techniques for detecting a tilt and vibration are broadly known and therefore will not be described further in detail.

The water level sensor 125 is a sensor which detects water levels and can be realized by a pressure sensor which converts a water level to an electrical signal, for example. For example, if a structure such as an embankment is an observation target, the water level is important for abnormality detection while it is important to observe a wall surface or the like to check the water. This is because if the water level exceeds a predetermined level, the water overflows, thus increases the likelihood of flood disaster, and even if that is not the case, the rise in water level increases the water pressure to the wall surfaces or the like, increasing the probability of abnormality occurrence on the wall surface or the like. Also, an underground water sensor or an underground water level sensor or the like may be used instead of the water level sensor 125 or in addition to the water level sensor 125.

The image pickup sensor 127 is a sensor which picks up an image of a structure and outputs a pickup image. The pickup image may be a still image or dynamic image. As the image pickup sensor 127, various sensors used for digital cameras can be broadly applied and this is realized by an element or the like in which RGB pixels are arranged in a Bayer array. Alternatively, the image pickup sensor 127 may be a sensor which outputs a monochrome image or a sensor using a thermography technique on the assumption of an output during the night when the light source is insufficient.

The sensor unit 120 may also include a weather sensor 129 for measuring the weather of the surrounding of the structure. The weather sensor 129 is a sensor which measures temperature, humidity, illuminance, the amount of ultraviolet rays, the amount of rainfall, wind speed, wind direction, barometric pressure and the like. The weather sensor 129 is realized by one of measuring instruments such as thermometer, hygrometer, illuminometer, ultraviolet intensity meter (ultraviolet measuring device), pluviometer, anemometer, anemoscope, and barometer, or by a combination of a plurality of such measuring instruments. A configuration made up of a combination of a plurality of such measuring instruments is broadly known as a weather meter. The weather sensor 129 in the embodiment can be realized by a weather meter. Since instruments such as thermometer or weather meters are widely known, detailed explanation of their configurations is omitted. The weather sensor 129 may be used to detect the state of a structure. However, in the embodiment, it is assumed that the weather sensor 129 is used for the decision on the observation mode to use. This feature will be described later.

As described above, the sensor unit 120 may includes at least two sensors, of the tilt sensor 121, the vibration sensor 123, the water level sensor 125, and the image pickup sensor 127. As described above, all of the vibration, tilt, water level, and pickup image are useful for the detection of the state of a structure. Each of these sensors may be used independently. However, by combining a plurality of these sensors, it is possible to multilaterally determine an abnormality of the structure.

The charging unit 130 charges the battery 111. The charging unit 130 can be realized by a photovoltaic panel 30 described later with reference to FIG. 2, for example, or by various circuits which supply electricity from the photovoltaic panel 30 to the battery 111. The charging unit 130 may also use other types of renewable energy than sunlight and may be realized by a unit which performs hydroelectric power generation, wind power generation, vibration power generation or the like. Specific configurations for various power generations are already known and therefore will not be described further in detail.

The processing unit 140 carries out various kinds of processing on the basis of sensing information from the sensor unit 120 and information received by the communication unit 150. The functions of the processing unit 140 can be realized by various processors (CPU or the like), hardware such as ASIC (application specific integrated circuit, gate array or the like), or a program or the like. Specifically, the processing unit 140 carries out the processing of determining the state of a structure on the basis of sensing information and the processing of setting an observation mode on the basis of information for observation mode setting. The information for observation mode setting may be generated in the processing unit 140 or may be acquired from another device.

The communication unit 150 communicates information with another device via a network. The network in this case can be realized by a WAN (wide area network), LAN (local area network) or the like, and may be wired or wireless. The network may also be realized by short-range wireless communication.

Figure 2:
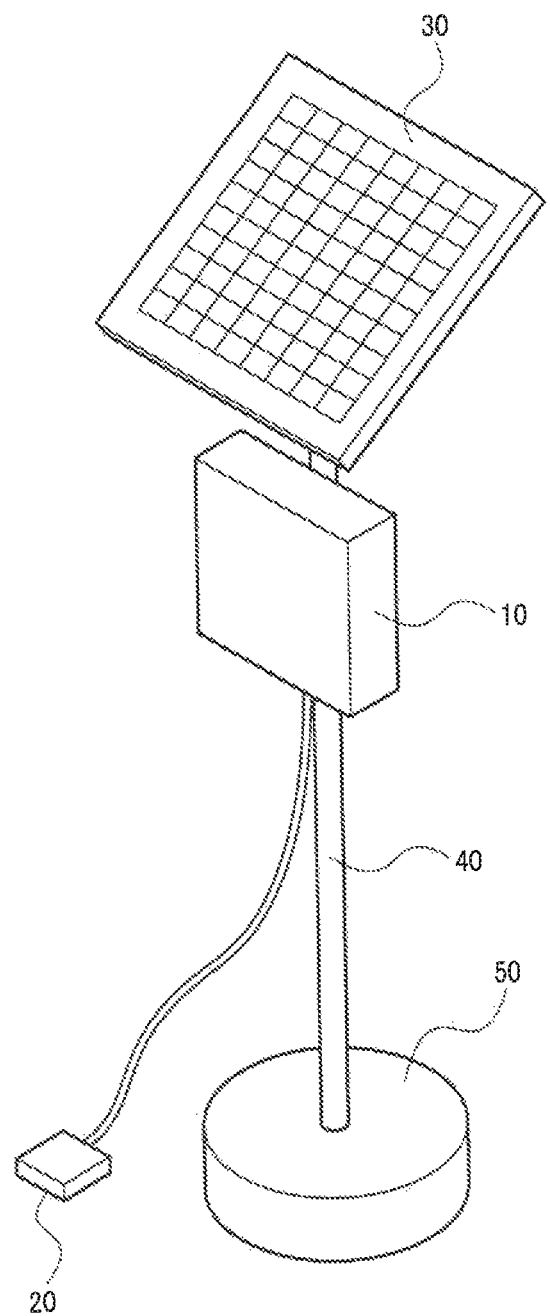
FIG. 2 shows an example of the appearance of the observation system.

FIG. 2 shows an example of the appearance of the observation system 100 (sensor terminal) according to the embodiment. The observation system 100 includes a casing 10, a sensor casing 20, the photovoltaic panel 30, a support pole 40, and a pedestal 50. However, observation system 100 is not limited to the configuration of FIG. 2 and can be implemented with various modifications such as omitting a part of these components or adding another component.

The casing 10 is a casing accommodating the battery 111 and the substrate where the processing unit 140 is provided. The sensor casing 20 is a casing connected to the casing 10 via a cable and accommodating the various sensors included in the sensor unit 120. While only one sensor casing 20 is shown in FIG. 2, a plurality of sensor casings 20 may be provided. For example, the tilt sensor 121 and the vibration sensor 123 are provided on a surface of a structure. The water level sensor 125 is provided at a position which is at least partly soaked in a measuring target liquid. The image pickup sensor 127 is provided at such a position and angle as to be able to pick up an image of a desired area of the structure. That is, since the desired position of installation differs according to the type of sensor, the number, shape, position of installation, and installation method of the sensor casing 20 can be implemented with various modifications. Alternatively, the sensors may be accommodated in a part of the casing 10.

The photovoltaic panel 30 is a panel which generates electricity on the basis of irradiation with sunlight and is made up of an array of a plurality of photovoltaic elements (cells).

The support pole 40 and the pedestal 50 are members to fix the casing 10 and the photovoltaic panel 30 at a desired position. The casing 10 and the photovoltaic panel 30 are fixed to the support pole 40, and the support pole 40 is held in a stable attitude to the ground or floor surface by the pedestal 50. Thus, the casing 10 and the photovoltaic panel 30 are held in a desired position and attitude. The photovoltaic panel 30 needs to be irradiated with sunlight and therefore may be provided at a position where there is sunlight. In some cases, the attitude of the photovoltaic panel 30 may be made variable according to the state of irradiation with sunlight.

Figure 3:
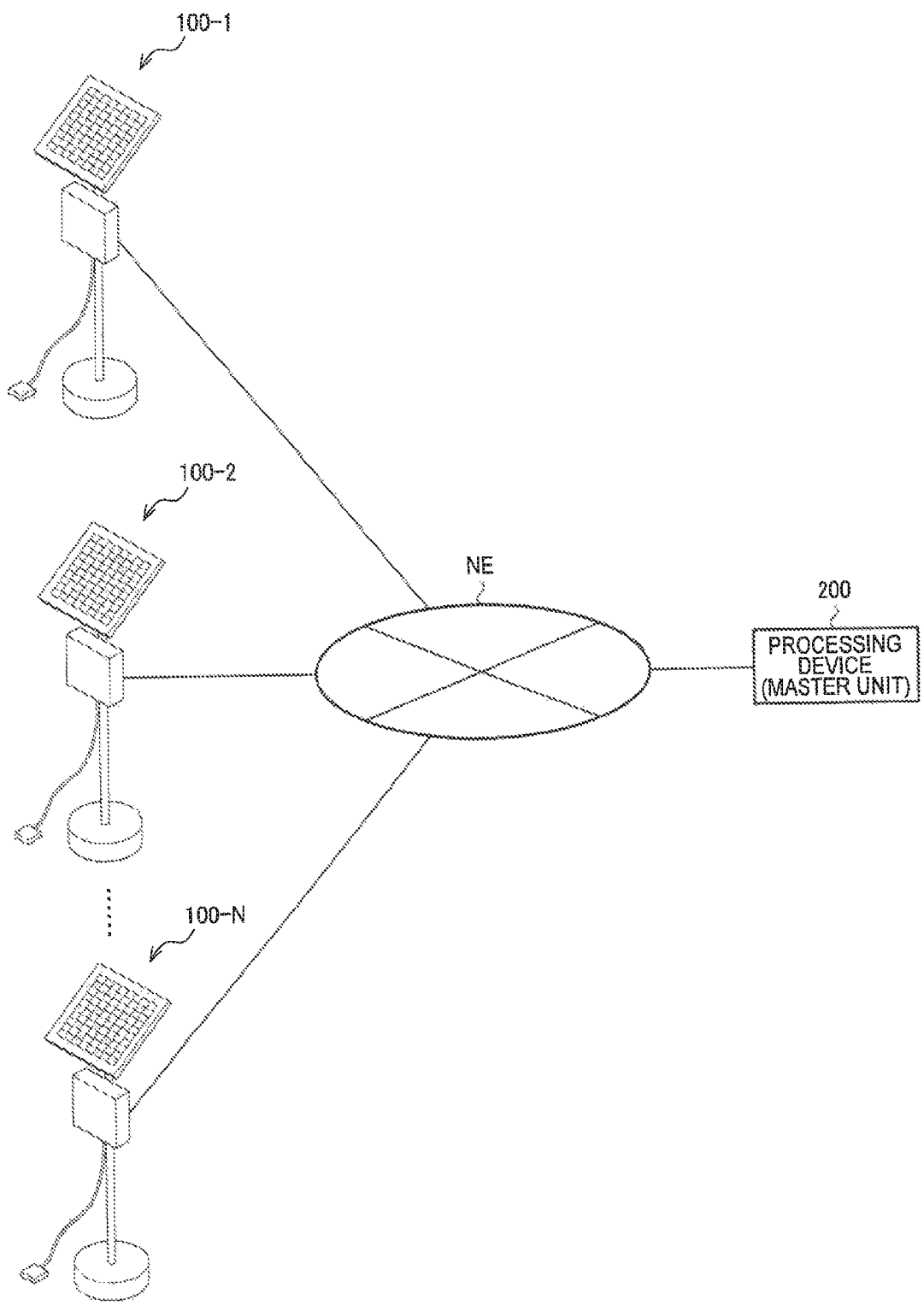
FIG. 3 shows an example of the configuration of a system including the observation system.

FIG. 3 shows an example of the configuration of a system including the observation system 100 according to the embodiment. The observation system 100 according to the embodiment may be used singly but may also be used with a separate processing device 200 (master unit). A plurality of observation system 100 may be connected to the master unit.

In the example shown in FIG. 3, first to N-th observation systems 100-1 to 100-N are connected to the processing device 200 via a network NE. As the network NE in this case, various networks such as WAN, LAN and short-range wireless communication can be used, as in the foregoing example. Each of the first to N-th observation systems 100-1 to 100-N has the configuration shown in FIGS. 1 and 2, performs sensing by the sensor unit 120, and outputs the result of detecting the state of a structure. Specifically, the processing unit 140 performs state detection processing based on sensing information from the sensor unit 120, and the communication unit 150 transmits the result of the processing to the processing device 200 via the network NE. However, a part of the processing carried out by the processing units 140 of the first to N-th observation systems 100-1 to 100-N may be executed by the processing device 200 (in a narrow sense, the processing unit of the processing device 200). Details of this will be described later as a modification.

The first to N-th observation systems 100-1 to 100-N may be arranged at different sites on a single structure or may be arranged on different structures from each other. While all of the observation systems 100 have the same structure in FIG. 3, the shape of the observation system, and the number and type of sensors included, may be changed according to the site of installation.

3. Example of Setting Observation Mode

Next, a method for setting an observation mode will be described. As described above, in the observation system 100 which detects the state of a structure, it is not enough to enable continuation of operation, as disclosed in JP-A-2003-346271 and JP-A-2013-73537. The observation system 100 needs to perform measurement with high accuracy and at a high frequency in a circumstance where it is considered that an abnormality of a structure is likely to occur.

To this end, first, at which timing an abnormality of a structure is likely to occur, must be estimated. Hereinafter, information for estimating whether an abnormality of a structure, that is, a disaster, is likely to occur or not, is referred to as information for disaster occurrence estimation, and a specific method for finding the information for disaster occurrence estimation will be described. While it is possible to use information for disaster occurrence estimation alone in setting an observation mode, history information of sensing information and remaining electricity information may be used along with information for disaster occurrence estimation in order to achieve a more proper operation. These types of information will be described as well. Also, a specific example of operation in each observation mode of a plurality of observation modes will be described.

3.1 Information for Disaster Occurrence Estimation

As a large factor in the occurrence of an abnormality of a structure, a change in the natural environment is conceivable. In other words, a disaster such as the collapse of a structure can occur due to a natural hazard. That is, in the observation system 100 of a structure, information about a natural hazard can be acquired as information for estimating whether a disaster is likely to occur or not (information for disaster occurrence estimation).

In the observation system 100 according to the invention, the processing unit 140 acquires information for disaster occurrence estimation and performs control such that the first observation mode is set if it is determined that the probability of disaster occurrence is below the first value, whereas the second observation mode is set if it is determined that the probability of disaster occurrence is above the second value, on the basis of the acquired information for disaster occurrence estimation, as described above.

In this way, the observation system 100 can determine in which period measurement at a high frequency and with high accuracy should be carried out. Therefore, proper operation control of the observation system 100 is enabled. As basic control, the sensor capability and the computational processing load (or the battery used, as described later as a modification) may be controlled according to whether the probability of disaster occurrence is high or low, as described above.

Here, the information for disaster occurrence estimation is not limited to information at the current time and includes predictions for the future. Therefore, by using the information for disaster occurrence estimation, it is possible to schedule not only which mode is to be set as the current observation mode but also what settings of observation modes should be done in the future. A specific example of this will be described later with reference to FIGS. 9 and 10.

A specific method for finding the information for disaster occurrence estimation will be described. If a slope or natural slope is an observation target, an abnormality of a structure is defined in a narrow sense as a landslide disaster. Therefore, using information indicating the degree of risk of occurrence of landslide disaster, whether it is a circumstance where an abnormality of the structure is likely to occur or not can be estimated. Since the probability of occurrence of landslide disaster can be estimated on the basis of the amount of rainfall per unit time (for example, one hour) or the amount of rainfall during a period of a certain length (for example, one day to several days), the information of the amount of rainfall can be used as the information for disaster occurrence estimation. Also, an embankment can be greatly affected by the amount of water and therefore the information of the amount of rainfall may be used as the information for disaster occurrence estimation. The same applies to structures such as a bridge.

It is also conceivable that a structure will be damaged by a gust of wind due to a downburst or tornado. That is, the information of wind speed can be used as the information for disaster occurrence estimation. Also, considering that a structure is strong against an external force in a certain direction and weak in another direction depending on the shape of the structure, it can be said that the information of wind direction is the information for disaster occurrence estimation as well.

As described above, since an abnormality of a structure can occur due to a natural hazard, information about the natural hazard may be used as the information for disaster occurrence estimation in the embodiment. Specifically, weather information is used as the information for disaster occurrence estimation.

The weather information in this case is information such as temperature, humidity, illuminance, the amount of ultraviolet rays, the amount of rainfall, wind speed, wind direction, and barometric pressure, or information computed on the basis of such information. As described above, the information such as temperature can be acquired by the weather sensor 129. Therefore, as an example, the sensor unit 120 of the observation system 100 may include the weather sensor 129, and the processing unit 140 may acquire the information for disaster occurrence estimation (weather information) by computation based on sensing information from the weather sensor 129.

In this way, in the observation system 100, the information for disaster occurrence estimation can be acquired and the independence of the observation system 100 can be enhanced. Also, since the acquired sensing information is information indicating the weather condition around the structure, information more properly reflecting the circumstances around the structure can be used as the information for disaster occurrence estimation.

However, the acquisition of the weather information is not limited to the independent acquisition in the observation system 100. For example, the observation system 100 may include the communication unit 150 capable of reception, as shown in FIG. 1, and the processing unit 140 may acquire the information for disaster occurrence estimation received by the communication unit 150.

As an example, in the configuration of FIG. 3, the processing device 200 may acquire the weather information, and the communication unit 150 of the observation system 100 may receive the weather information from the processing device 200 via the network NE. The processing device 200 may acquire information announced by the Meteorological Agency or the like, for example, as the weather information in the embodiment. The Meteorological Agency announces not only temperature and the amount of rainfall but also information about natural hazards in the form of warnings and notices. Therefore, information of warnings and notices may be used as the weather information in the embodiment. Also, the communication unit 150 of the observation system 100 may receive the weather information from a device that is different from the processing device 200, via the network NE.

In this way, the computation of the weather information is not needed in the observation system 100. Therefore, the computational processing load on the processing unit 140 can be reduced, and in some cases, the weather sensor 129 can be omitted from the sensor unit 120. The Meteorological Agency announces one piece of weather information over a relatively broad range (for example, several sites per prefecture). Therefore, the weather information received by the communication unit 150 does not pinpoint the information around the structure and therefore is inferior in terms of the accuracy of sensing information, compared with the case where the weather sensor 129 of the observation system 100 is used. However, the computational processing at the Meteorological Agency is very complex processing using a supercomputer and therefore advantageous in terms of processing accuracy.

The processing unit 140 may set whether to acquire the information for disaster occurrence estimation by computations based on sensing information from the weather sensor 129 or acquire the information for disaster occurrence estimation received by the communication unit 150, according to the circumstances. In other words, while the sensor unit 120 of the observation system 100 includes the weather sensor 129, the sensor unit 120 may set whether to cause the weather sensor 129 to operate or not and whether to perform computational processing based on sensing information from the weather sensor 129 or not, according to the circumstances. Since the weather information acquired by the respective methods have different characteristics from each other and different amounts of electricity and processing load are required for the acquisition of such weather information, as described above, a proper method may be selected according to the circumstances. A specific example of this will be described later.

Figure 4:
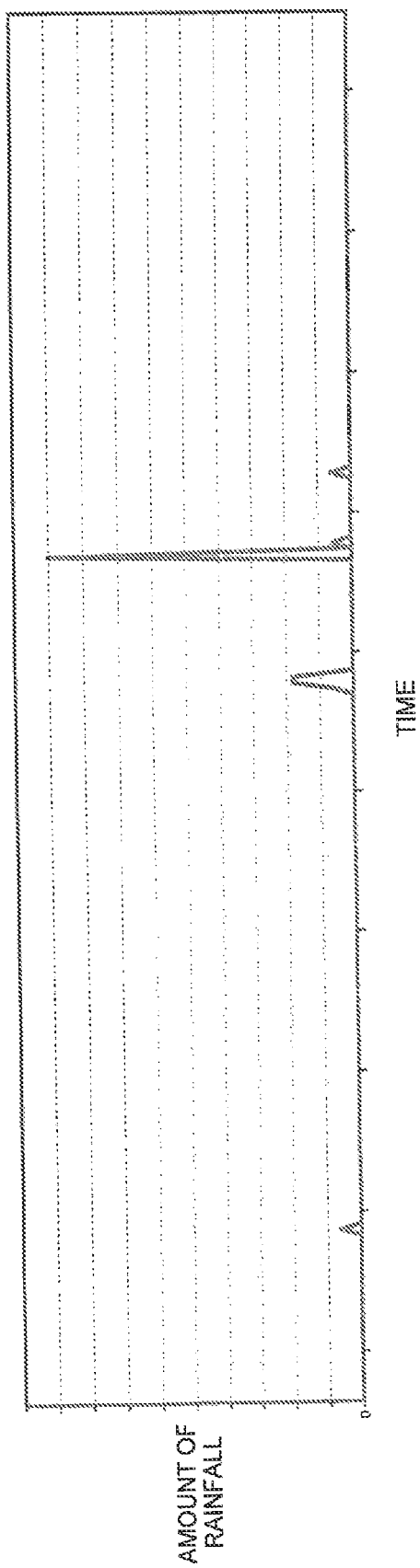
FIG. 4 shows an example of change in rainfall with time.
Figure 5:
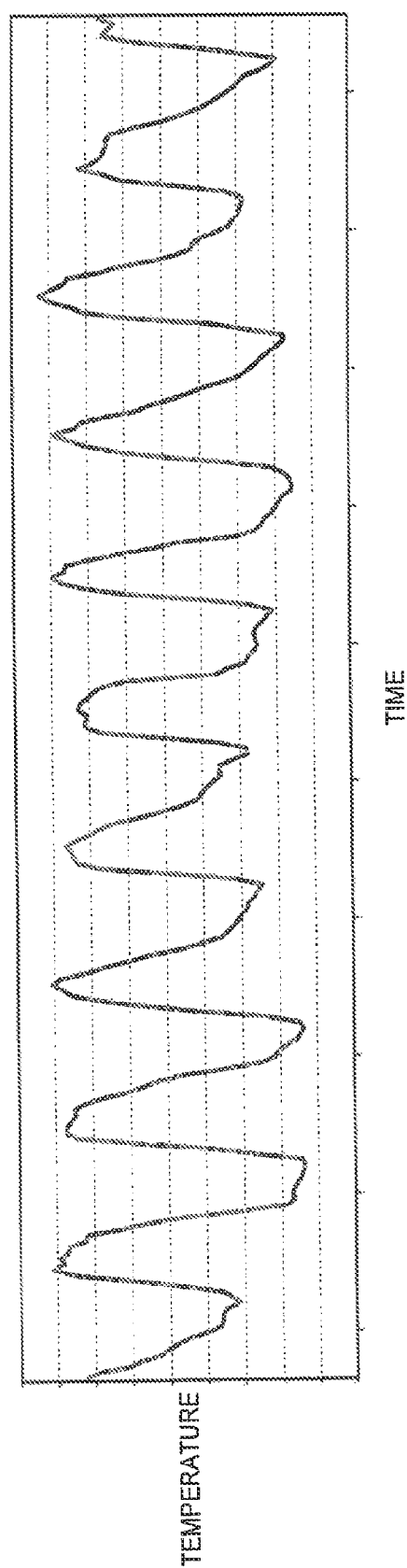
FIG. 5 shows an example of change in temperature with time.
Figure 6:
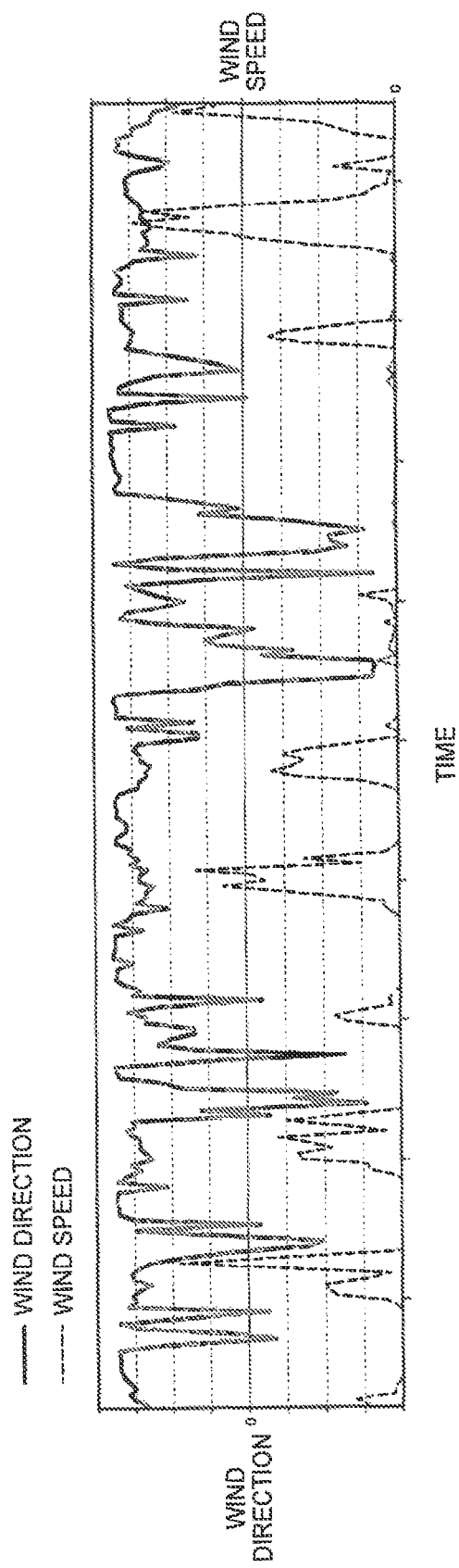
FIG. 6 shows an example of change in wind direction and wind speed with time.
Figure 7:
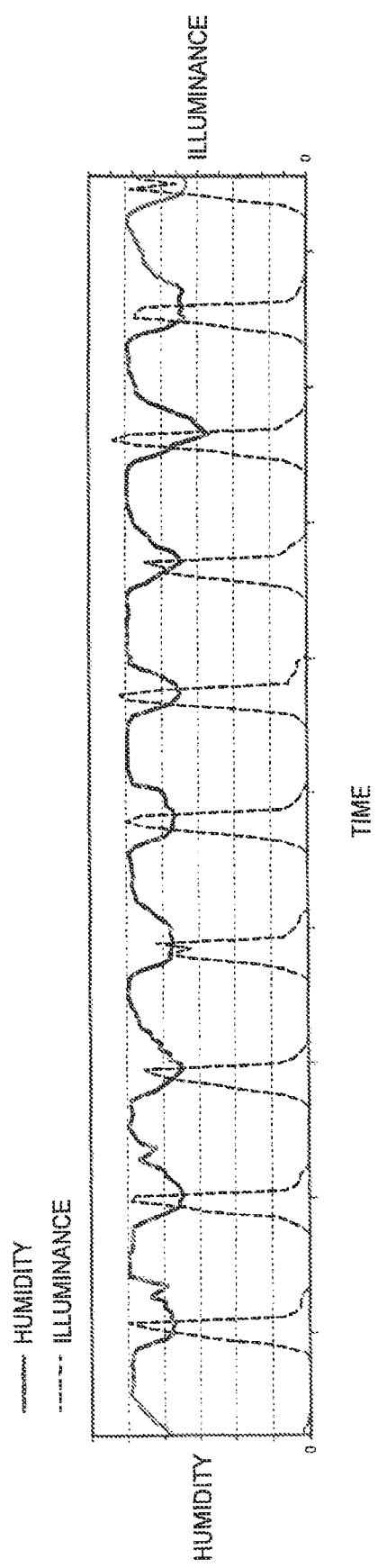
FIG. 7 shows an example of change in humidity and illuminance with time.

FIGS. 4 to 7 show examples of change in the acquired weather information with time. FIG. 4 shows change in the amount of rainfall with time. FIG. 5 shows change in humidity (temperature) with time. FIG. 6 shows change in wind direction and wind speed with time. FIG. 7 shows change in illuminance and humidity with time. In FIGS. 4 to 7, the horizontal axis represents time, with one scale corresponding one day. The vertical axis represents the value of each type of information. The unit on the vertical axis is as shown in the illustrations.

The estimation of the probability of disaster occurrence based on the information for disaster occurrence estimation can be realized by various methods. For example, whether the values shown in FIGS. 4 to 7 are within a normal range or not may be determined. In the example of the amount of rainfall shown in FIG. 4, as the amount of rainfall increases, the probability of occurrence of landslide disaster or flood disaster increases. Therefore, if the amount of rainfall (value per hour, or accumulated amount over a longer span) exceeds a predetermined threshold, it is determined that the probability of disaster occurrence is high. Alternatively, since the probability of disaster occurrence is not limited to the two determination results of high and low, the value of the probability of disaster occurrence may be computed from the value of the amount of rainfall.

Similarly, in the case of temperature, if the temperature is excessively high, an abnormality such as deformation of a part of the structure due to the high temperature can occur. Alternatively, if the temperature is excessively low, an abnormality such as freezing of a part of the structure is conceivable. Therefore, with respect to temperature, the probability of disaster occurrence can be similarly estimated according to whether its value deviates from a normal range or not, or the degree of deviation from the normal range. Also, the temperature in this case is not limited to atmospheric temperature and may be the surface temperature or internal temperature of the structure.

As for wind speed, a higher wind speed has a greater force applied to the structure. Therefore, if its value is large, it may be determined that the probability of disaster occurrence is high. Also, if it is known that the structure is weak against a force in a specific direction, it may be determined that the probability of disaster occurrence is high if the wind direction is such that a force of wind is applied in this direction.

Similarly, with respect to illuminance and humidity, a normal range may be set and the probability of disaster occurrence may be estimated according to whether the illuminance or humidity deviates from the normal range or not, or the degree of deviation from the normal range. Similar ideas may be applied to cases where other types of weather information are used.

Meanwhile, Japan Meteorological Agency, Forecast Department, Forecast Division, "Disaster Risk Prediction Technique Utilizing Rainfall Information (for Landslide Disaster)," May 24, 2013, URL: http://www.jma.go.jp/jma/kishou/minkan/koushu130524/shiryou2.pdf, discloses a technique in which the degree of landslide disaster risk is predicted using not only the amount of rainfall but also the soil water index. Therefore, the degree of landslide disaster risk may be received as the weather information, or the processing unit 140 of the observation system 100 may compute the degree of landslide disaster risk by a similar technique. In this case, as the degree of risk increases, the probability of disaster occurrence becomes higher. Alternatively, the information of warnings and notices may be acquired. In this case, it may be determined that the probability of disaster occurrence is high if a warning is issued, that the probability of disaster occurrence is intermediate if a notice is issued, and that the probability of disaster occurrence is low if no warning or notice is issued.

3.2 History Information of Sensing Information

Figure 8:
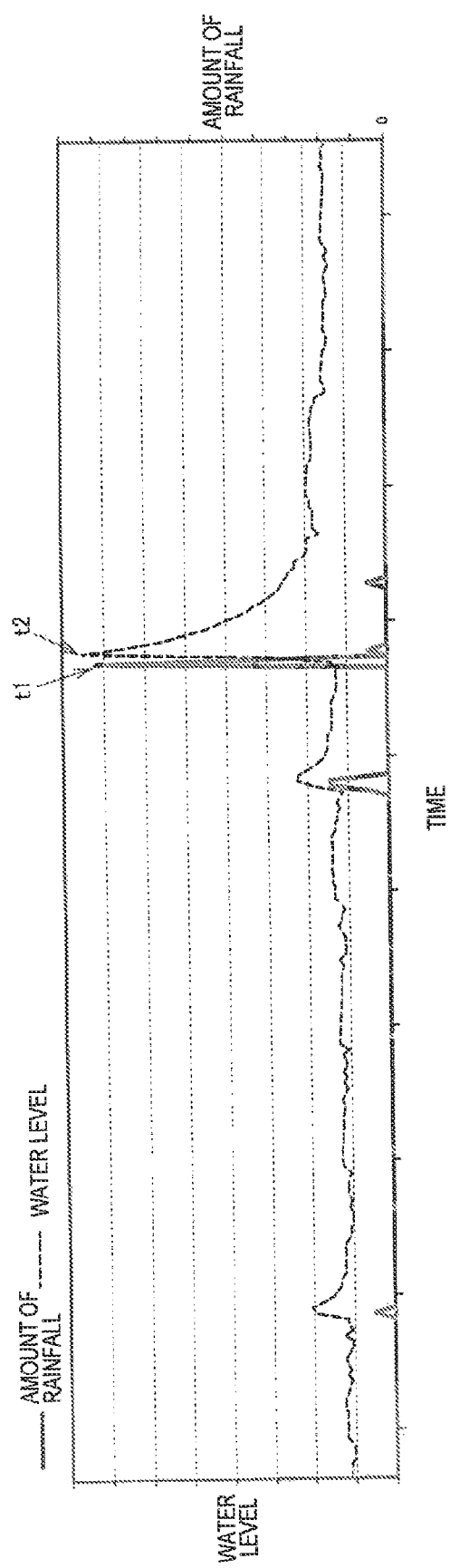
FIG. 8 shows an example of change in the amount of rainfall and water level with time.

FIG. 8 shows change in water level with time in addition to the change in the amount of rainfall with time shown in FIG. 4. In a reservoir, not only the rain directly falling in the reservoir but also the rain falling in different places flows in via soil, rivers and the like. Therefore, there is a difference between a timing when the amount of rainfall reaches its maximum (in the example of FIG. 8, t1) and a timing when the water level reaches its maximum (in the example of FIG. 8, t2). When the amount of rainfall is compared with the water level, the water level is more closely related to the likelihood of flood disaster. Therefore, during a period including the timing t2, when the water level is high, the observation system 100 must operate in an observation mode (second observation mode) in which measurement is carried out at a high frequency and with high accuracy.

However, if the second observation mode is set at the timing t1, when the amount of rainfall is large, and the first observation mode is restored immediately after that (before t2), the operation in the second observation cannot be carried out during the period including t2, when measurement with high accuracy and at a high frequency should be carried out. On the other hand, if the operation in the second observation mode is continued from t1, electricity consumption increases and the electricity of the battery 111 may run out before t2. Therefore, again, there is a risk that the second observation mode cannot be set during the period including t2. While an example in which the water level is constantly measured is shown in FIG. 8 as a matter of convenience, the various sensors for detecting the state of a structure are not necessarily in constant operation, and even if the sensors are in operation, the operation rate is not necessarily enough, as described later with reference to FIG. 12. Therefore, there are cases where, while the setting of an observation mode can be carried out on the basis of change in the measured value of water level, this is not enough.

Thus, the information for disaster occurrence estimation may be information including a prediction result based on the weather information, instead of the weather information alone. In the case of FIG. 8, not only a peak in the amount of rainfall but also a predicted peak in the water level is acquired as the information for disaster occurrence estimation. As an example, the soil water index or the like may be used, and future changes in the water level may be predicted from the measured amount of rainfall (and predicted amount of rainfall) and the soil water index, and a period during which the system should operate in the second observation mode may be set. The soil water index is information indicating the amounts of water flowing into and out of the soil. Therefore, if the soil water index around the structure is known, the time difference can be estimated. Also, while FIG. 8 illustrates the relation between the amount of rainfall and the water level, the soil water index can also be applied to other landslide disasters, as described in Japan Meteorological Agency, Forecast Department, Forecast Division, "Disaster Risk Prediction Technique Utilizing Rainfall Information (for Landslide Disaster)," May 24, 2013, URL: http://www.jma.go.jp/jma/kishou/minkan/koushu130524/shiryou2.pdf.

Although the amount of rainfall is employed here as a specific example of the weather information, the technique can be applied extensively to other types of weather information.

While the parameter to find the soil water index should be set according to the specific state of the soil, a parameter that is uniform across the country is used in Japan Meteorological Agency, Forecast Department, Forecast Division, "Disaster Risk Prediction Technique Utilizing Rainfall Information (for Landslide Disaster)," May 24, 2013, URL: http://www.jma.go.jp/jma/kishou/minkan/koushu130524/ shiryou2.pdf. A parameter for calculating the soil water index may be found from specific characteristics of the surrounding soil (components of the soil, geographic features, and the like). However, it leads to a heavy burden of measuring work or the like.

Thus, in the embodiment, the processing unit 140 may set an observation mode on the basis of the information for disaster occurrence estimation, and the history information of the sensing information of the structure from the sensor unit 120.

In the example of FIG. 8, information to estimate the time difference between a peak in the amount of rainfall and a peak in the water level is set on the basis of the past history of the amount of rainfall and the water level. For example, if the data shown in FIG. 8 is left as history, since there are two other peaks in the amount of rainfall and in the water level in addition to t1 and t2, by referring to these data, it is understood that the time difference between the peak in the amount of rainfall and the peak in the water level is approximately three to four hours. That is, in the case where the data of FIG. 8 is acquired in the observation system 100, if the timing (period) when the amount of rainfall exceeds a normal range is specified or estimated on the basis of the weather information, the operation in the second observation mode is executed, covering at least three or four hours following that timing. Thus, the probability of disaster occurrence can be predicted properly from the history information of the sensing information without having to actually find a parameter of the soil water index.

While an example of finding the time difference between peaks from the history information of the sensing information is described above in order to simplify the explanation, different processing may be carried out as well. For example, the correlation between the information for disaster occurrence estimation and the probability of disaster occurrence (in the example of FIG. 8, the correlation between the amount of rainfall and the water level) may be found on the basis of the information for disaster occurrence estimation and the history information of the sensing information.

In any case, since pinpoint history data that is actually measured by the observation system 100 is used, the probability of disaster occurrence can be predicted easily with high accuracy.

3.3 Remaining Electricity Information

As described above, the processing unit 140 can decide a timing of switching between observation modes on the basis of the information for disaster occurrence estimation (and the history information of the sensing information according to need).

For example, it is possible to schedule operations in such away that the observation system operates in the first observation mode from the present up until month $M_1$, day $D_1$, hour $h_1$, minute $m_1$ and then operates in the second observation mode from month $M_1$, day $D_1$, hour $h_1$, minute $m_1$ until month $M_2$, day $D_2$, hour $h_2$, minute $m_2$. In this example, each of month $M_1$, day $D_1$, hour $h_1$, minute $m_1$ and month $M_2$, day $D_2$, hour $h_2$, minute $m_2$ is the timing of switching between observation modes. In this way, it is possible to perform efficient operations such that necessary sensing information is acquired by carrying out measurement at a high frequency and with high accuracy in a circumstance where a disaster is likely to occur and therefore the need for observation is high, whereas electricity consumption is reduced by carrying out measurement at a low frequency and with low accuracy in a circumstance where a disaster is less likely occur and therefore the need for observation is low.

However, in the above example, the observation mode to use is decided in view of whether measurement is needed or not, on the basis of the information for disaster occurrence estimation (probability of disaster occurrence), and whether an operation in a desired observation mode is actually executable or not is not considered. Specifically, when operating in a set observation mode, whether the electricity of the battery 111 is sufficient or not is unknown.

Thus, the processing unit 140 may set an observation mode on the basis of the information for disaster occurrence estimation and remaining electricity information of the power supply unit 110.

Here, the remaining electricity information is information indicating the amount of remaining electricity (battery voltage) of the battery 111. The amount of remaining electricity includes not only the current value but also a future prediction value. The remaining electricity information may be found on the basis of electricity consumption prediction processing. As an example, the processing unit 140 monitors fluctuations in the battery voltage of the battery 111, predicts future fluctuations in the battery voltage on the basis of the result of the monitoring, and defines the result of the prediction as the remaining electricity information. In this case, the processing unit 140 may predict electricity consumption according to the observation mode that is set.

Alternatively, the remaining electricity information may be found on the basis of power generation amount prediction processing in addition to the electricity consumption prediction processing. The power generation amount prediction processing can be executed using the weather information, as described in JP-A-2013-73537, for example. In this case, the difference between the predicted amount of power generated and the electricity consumption indicates the amount of fluctuations in the remaining electricity information.

Then, the processing unit 140 verifies whether the scheduling of observation modes set on the basis of the information for disaster occurrence estimation is executable or not, on the basis of the remaining electricity information. If it is determined that electricity will not run out (the battery voltage will not fall below a predetermined value) even when the set scheduling of observation modes is executed, the processing unit 140 performs control to execute the set scheduling. Meanwhile, if the battery voltage falls below the predetermined value when the set scheduling of observation modes is executed, the processing unit 140 reschedules observation modes. By thus using the remaining electricity information as well, it is possible to set observation modes more properly.

FIGS. 9 and 10 show a specific example of scheduling of observation modes. FIGS. 9 and 10 show an example in which four observation modes A to D can be set, as described later with reference to FIG. 12. In the mode A, the frequency and accuracy of measurement are the lowest and electricity consumption is the smallest. In the mode D, the frequency and accuracy of measurement are the highest and electricity consumption is the greatest. The modes B and C are intermediate modes. The electricity consumption is in the order of mode A<mode B<mode C<mode D.

FIG. 9 shows a schedule of observation modes set on the basis of the information for disaster occurrence estimation. A schedule such that the observation system operates in the mode B from the current time to month $M_1$, day $D_1$, hour $h_1$, minute $m_1$, then operates in the mode C from month $M_1$, day $D_1$, hour $h_1$, minute $m_1$ to month $M_2$, day $D_2$, hour $h_2$, minute $m_2$, and operates in the mode D after month $M_2$, day $D_2$, hour $h_2$, minute $m_2$.

FIG. 10 shows the result of rescheduling as it is determined that the schedule of FIG. 9 is not executable, considering the remaining electricity information. First, the observation mode from the current time to the next mode switching timing is changed from the mode B to the mode A. As described above, since electricity consumption is smaller in the mode A than in the mode B, the possibility of electricity running out in the middle of the schedule can be restrained by changing modes.

Also, in FIG. 10, the timing of switching from the mode A to the mode C is changed from month $M_1$, day $D_1$, hour $h_1$, minute $m_1$ to month $M_3$, day $D_3$, hour $h_3$, minute $m_3$. If month $M_3$, day $D_3$, hour $h_3$, minute $m_3$ is a timing later than month $M_1$, day $D_1$, hour $h_1$, minute $m_1$, the operation period in the mode C can be reduced and the operation period in a more power-saving mode than the mode C (the mode B in FIG. 9, and the mode A in FIG. 10) can be extended, compared with the schedule of FIG. 9. Therefore, again, the possibility of electricity running out in the middle of the schedule can be restrained. If enough electricity is secured by changing the mode from the current time to the mode A, month $M_3$, day $D_3$, hour $h_3$, minute $m_3$ can be a timing before month $M_1$, day $D_1$, hour $h_1$, minute $m_1$.

Figure 11:
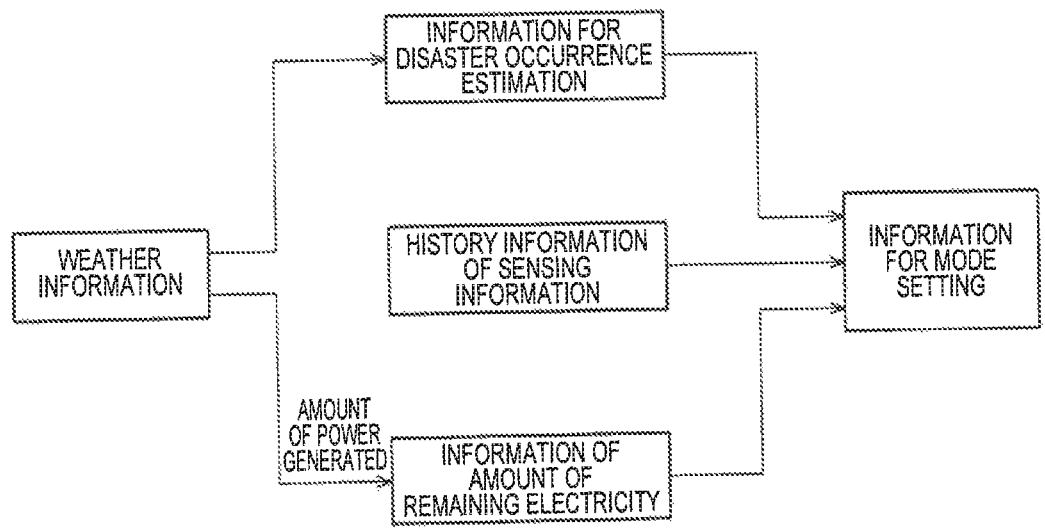
FIG. 11 explains the relation between each kind of information.

FIG. 11 shows the relation between the information used in the processing according to the embodiment. As shown in FIG. 11, the information for disaster occurrence estimation, the history information of the sensing information, and the remaining electricity information are used for the computation of information for setting an observation mode. The information for disaster occurrence estimation is found on the basis of the weather information. The remaining electricity information is found by predicting the amount of power generated, based on the result of monitoring the battery voltage and the weather information.

However, not all the information in FIG. 11 is essential and a part of the information can be omitted. For example, one of the history information of the sensing information and the remaining electricity information may be omitted. In other words, the processing unit 140 may set an observation mode on the basis of at least one of the history information of the sensing information of the structure from the sensor unit 120 and the remaining electricity information of the power supply unit 110. If the power generation amount prediction processing is not carried out, the weather information is not necessary in computing the remaining electricity information.

3.4 Example of Operation in Each Observation Mode

Next, a specific example of operation in each observation mode will be described. FIG. 12 explains an example of setting the four observation modes A to D, and the processing outline, the electricity consumption, the drive sensor type, the sensor sampling cycle, the information transmission cycle by the communication unit 150 and the content of computation by the processing unit 140 in each observation mode.

As described above, basically, an observation mode is set according to whether the probability of disaster occurrence is high or low, determined on the basis of the information for disaster occurrence estimation. As shown in FIG. 12, the mode A or the mode B is set if the probability of disaster occurrence is the lowest. The mode C is set if the probability of disaster occurrence is high. The mode D is set if the probability of disaster occurrence is very high.

However, problems arise if the system cannot actually operate in the set observation mode. Therefore, the final observation mode is decided in consideration of the remaining electricity information, as described above. For example, if the probability of disaster occurrence is low, the mode to use is decided according to the amount of remaining electricity. The mode A is set if the amount of remaining electricity is very small. The mode B is set if electricity is left to a certain extent but not enough. If the amount of remaining electricity is enough, the mode C may be set regardless of whether the probability of disaster occurrence is high or low.

The mode A and the mode B can be regarded as observation modes for restraining electricity consumption and securing the amount of remaining electricity. For example, the case where it is determined that the probability of disaster occurrence is high during a first period and that the probability of disaster occurrence is even higher during a second period following the first period, is considered. In this case, the first period has a certain level of priority of measurement, but the second period should be given higher priority to carry out measurement at a high frequency and with high accuracy. Therefore, if the amount of remaining electricity is not enough, the electricity for measurement during the second period must be secured even at the cost of the measurement frequency and accuracy during the first period. Thus, in such a case, the mode A or the mode B is set for the first period. That is, depending on the circumstance of future scheduling, the mode A or the mode B can be set even if the probability of disaster occurrence is relatively high.

The "processing outline" is an explanation of the status of each mode and an outline of the content of processing executed in each mode. As shown in FIG. 12, the mode A is a mode in which the reduction of electricity consumption is given top priority and therefore measurement is minimized. The mode B is a mode in which electricity consumption is low, of normal modes. The mode C is a mode in which electricity consumption is high, of normal modes. In the mode B, more detailed measurement is carried out than in the mode A, but restraining electricity consumption is regarded as important. In the mode C, since the amount of remaining electricity is relatively enough, necessary and sufficient processing can be executed. The mode D is a mode in which measurement for disaster occurrence prediction is given top priority and the functions of the observation system 100 is utilized to the maximum. As can be understood from the explanation, the electricity consumption is in the order of mode A<mode B<mode C<mode D.

Various techniques for controlling the electricity consumption are conceivable. For example, the electricity consumption may be controlled by switching the sensor capability between high and low. More specifically, the sensor unit 120 includes a plurality of sensors, and the processing unit 140 increases the number of sensors to operate, of the plurality of sensors, and thus increases the sensor capability.

In this way, sensor operations corresponding to the respective observation modes can be realized by controlling the number (type) of sensors to operate. A specific example is described with reference to FIG. 12. The case where the sensor unit 120 includes the tilt sensor 121, the vibration sensor 123, the water level sensor 125, and the image pickup sensor 127, as shown in FIG. 1, is considered. In the observation mode A, only a sensor or sensors that are important are made to operate and the other sensors are not made to operate, thus reducing electricity consumption. In the example of FIG. 12, the case where a slope or natural slope is an observation target is considered. Therefore, in the mode A, only the tilt sensor 121 is made to operate. The same applies to the mode B. In the mode C, the vibration sensor 123 and the water level sensor 125 are made to operate in addition to the tilt sensor 121. In this way, the state of the structure can be detected from a wider variety of information, though the electricity consumption increases. In the mode D, the image pickup sensor 127 is made to operate in addition to the three sensors operating in the mode C.

The processing unit 140 may increase the sensor capability by raising the operation rate of sensors included in the sensor unit 120.

In this way, sensor operations corresponding to the respective observation modes can be realized by controlling the operation rate (sampling rate, sampling cycle) of the sensor which operates. In the example of FIG. 12, in the mode A, the tilt sensor 121 is made to operate once an hour, and in the mode B, the tilt sensor 121 is made to operate once a minute. In the mode A and the mode B, the sensor to operate is the same, that is, the tilt sensor 121, but the operation rate is different. Therefore, the electricity consumption can be made smaller in the mode A, and the frequency of acquisition of sensing information (number of data per unit time) can be made higher in the mode B. That is, proper control according to the circumstances is enabled. In the mode C, the tilt sensor 121 and the vibration sensor 123 are made to operate at 100 sps (samples per sec; the number of times of sampling per second), and the water level sensor 125 is made to operate at 10 sps. That is, when the mode B is compared with the mode C, both of the type of sensor and the operation rate are changed. In the mode D, the image pickup sensor 127 is made to operate at 1 sps in addition to the operations in the mode C.

Although not illustrated in FIG. 12, the processing unit 140 may increase the sensor capability by increasing the range or sensitivity of sensors included in the sensor unit 120. For example, in the second observation mode, the processing unit 140 expands the range of physical quantity (range, or dynamic range) that can be detected by the sensors, compared with the first observation mode. Alternatively, in the second observation mode, the processing unit 140 increases a signal allocated to a predetermined physical quantity range (for example, the voltage width for an analog signal, and the number of bits for a digital signal), that is, sensitivity (resolution), compared with the first observation mode. In other words, the processing unit 140 increases the sensor capability by increasing the volume of information included in one round of output from sensors included in the sensor unit 120.

As described above, in the example of FIG. 12, the sensor capability is changed using both the number of sensors made to operate and the operation rates of the sensors. However, using both of these is not essential and it is possible to change the sensor capability by controlling one of these.

Also, the observation system 100 may include the communication unit 150 capable of transmission, as shown in FIG. 1, and in the second observation mode, the processing unit 140 may increase the transmission rate of the sensing information to the outside by the communication unit 150, compared with the first observation mode. In other words, the electricity consumption may be controlled by controlling the transmission rate of the sensing information to the outside.

In the observation system 100 according to the embodiment, it is assumed that the sensing information from the sensor unit 120, the result of detecting the state of a structure based on the sensing information, or the like, is transmitted to an external device. The external device is the processing device (master unit) 200, for example. The observation system 100 operates independently, and the user confirms the state of the structure from the sensing information transmitted to the processing device 200. Therefore, if measurement needs to be carried out at a high frequency and with high accuracy, the sensing information or the like needs to be communicated to the outside at a high frequency. In contrast, if measurement may be carried out at a low frequency and with low accuracy, the communication of the sensing information or the like may be at a low frequency.

In the example of FIG. 12, the communication of the sensing information to the outside is carried out once a day in the mode A, once an hour in the mode B, once a minute in the mode C, and once a second in the mode D. Thus, if the probability of disaster occurrence is high, the sensing information is frequently transmitted to the external device and therefore the user operating the external device can properly confirm the state of the structure. Meanwhile, if the probability of disaster occurrence is low, the frequency of transmission of the sensing information to the external device is low and therefore the electricity consumption of the observation system 100 can be reduced.

The processing unit 140 may also change the load of computational processing using the sensing information, according to the observation mode. In the example of FIG. 12, measurement by the tilt sensor 121 is carried out in the mode A and the mode B. However, in the mode A, only the simplified tilt angle determination is carried out, whereas in the mode B, the future prediction of title angle transition and determination on whether the tilt angle is not in an abnormal range are carried out. That is, the processing unit 140 may change the load of computational processing by changing the information to be found by the computation, or by changing the number of parameters used for the computation. In the case of the above example, as the information to be computed increases, the load increases. Therefore, the load of computational processing is in the order of mode A<mode B. The mode A is advantageous in terms of electricity consumption, and the mode B is advantageous in terms of the accuracy of the result of computational processing. In this way, it is possible to realize a proper operation corresponding to the observation mode by controlling the content (load) of computational processing.

In the mode C, since the vibration sensor 123 and the water level sensor 125 operate, the analysis processing on vibration intensity and frequency, the prediction of water level transition, and the determination on whether the water level is not in an abnormal range are carried out. In the mode C, since a plurality of types of information such as tilt, vibration, and water level, is acquired, integrated prediction of disaster occurrence may be carried out by combining these types of information. Although the computational processing in the mode D is similar to that in the mode C in the example of FIG. 12, processing based on the information from the image pickup sensor 127 (for example, determination on falling down based on image processing, or the like) may be carried out. That is, the processing unit 140 may change the load of computational processing by changing the number of sensors to be computation targets.

It is also possible to consider that the processing unit 140 changes the load of computational processing by changing the computational processing mode (computational program to be executed). For example, in the mode A, the processing unit 140 executes a first computational processing mode. The first computational processing mode is a mode in which a simplified tilt angle determination program (simplified tilt angle determination module) is executed. Similarly, in the mode B, the processing unit 140 executes a second computational processing mode. The second computational processing mode is a mode in which the simplified tilt angle determination program, a tilt angle transition prediction program, and a tilt angle determination program are executed. In the modes C and D, a computational processing mode in which programs for vibration, water level, and integrated disaster determination are executed, is executed in addition to the mode B.

As described above, the control according to the observation mode can be executed on the basis of multiple points of view such as the number of sensors to operate, the operation rate, the communication rate to the outside, and the load of computational processing by the processing unit 140. While an example in which all these points are combined is explained in FIG. 12, this example is not limiting and at least one of these points may be used.

4. Modifications

Several modifications will be described below.
4.1 Switching of Battery According to Observation Mode In the above description, it is assumed that the battery 111 is the same in each observation mode. However, in the embodiment, control is performed so that the observation system 100 operates properly in circumstances where the need for measurement is high. The control in this case is, in other words, the control for the observation system 100 to make full use of its functions without having any limitation to the available electricity in the second observation mode (in the case of FIG. 12, the mode D). That is, from a viewpoint that a sufficient amount of remaining electricity should be secured at the time of operation in the second observation mode, a battery dedicated for the second observation mode that is not used in the first observation mode may be provided.

Specifically, the observation system 100 according to the embodiment includes a power supply unit 110 having a plurality of batteries, a sensor unit 120 which detects the state of a structure on the basis of electricity from the power supply unit 110, a charging unit 130 which charges at least one battery of the plurality of batteries from renewable energy, and a processing unit 140 which processes sensing information detected by the sensor unit 120 in one observation of a plurality of observation modes including at least a first observation mode and a second observation mode in which a battery that is not used in the first observation mode, of the plurality of batteries, is used. The processing unit 140 acquires information for disaster occurrence estimation, and performs control such that the first observation mode is set if it is determined that the probability of disaster occurrence is below a first value, on the basis of the acquired information for disaster occurrence estimation, whereas the second observation mode is set if it is determined that the probability of disaster occurrence is above a second value that is equal to or greater than the first value.

As an example, the battery 111 includes a first battery for the first observation mode, and a second battery for the second observation mode. Each part of the observation system 100 operates with electricity from the first battery in the first observation mode and operates with electricity from the second battery in the second observation mode. Thus, since the second battery is not used in the first observation mode, the electricity for the second observation mode can be secured regardless of specific operation contents in the first observation mode. That is, the likelihood of being able to execute measurement with high accuracy and at a high frequency with sufficient electricity at the time of setting the second observation mode becomes higher.

The battery 111 is not limited to the form including two batteries and may include three or more batteries. Also, it suffices that the battery for the first observation mode and the battery for the second observation mode do not perfectly coincide with each other. A part of the batteries may be used in both the first observation mode and the second observation mode. In other words, the battery for the second observation mode may include at least one battery that is not used in an observation mode other than the second observation mode.

Alternatively, a battery which is also used in the first observation mode but whose use at a predetermined level or above is prohibited (which is set in such a way that the battery voltage will not drop to a predetermined value or below) may be used as the battery for the second observation mode. In this case, the battery for the second observation mode can be used in another observation mode, but it is guaranteed that electricity necessary for the operation in the second observation mode is left without fail.

4.2 Processing by External Device

While each processing described above is executed by the processing unit 140 of the observation system 100, this is not limiting. For example, each processing may be carried out by a processing unit of an external device. An example in which the external device is the processing device (master unit) 200 shown in FIG. 2 will described below.

For example, a part or the entirety of the processing of detecting the state of a structure based on sensing information (state determination processing) may be carried out by the processing device 200. In this case, the observation system 100 acquires sensing information and transmits the sensing information to the processing device 200 via the communication unit 150. The processing device 200 executes the processing of detecting the state of a structure based on the sensing information transmitted thereto. As specific computation contents, the various computations shown in FIG. 12 may be employed.

The processing device 200 can be realized by a PC (personal computer) or server system, for example, and has fewer limitations on the processor performance, memory capacity and the like than the independent observation system 100. If an AC power source is supplied, the limitation on the battery is smaller. Therefore, the processing device 200 may change the load of computational processing according to the observation mode as shown in FIG. 12 but may carry out high-load computations (for example, computations in the mode C, the mode D and the like in FIG. 12) regardless of the observation mode. However, since the type (number) of sensing information depends on the type (number) of sensors driven in the observation system 100, there may be a limitation in this respect due to the observation mode.

The processing carried out by the processing device 200 is not limited to the computation based on the sensing information. For example, the computation of the weather information based on the data from the weather sensor 129, the computation of the information for disaster occurrence estimation, the computation of the remaining electricity information by predicting the transition of the remaining capacity of the battery, and the like, may be carried out. Alternatively, the processing device 200 may carry out observation mode switching determination processing based on the information for disaster occurrence estimation. In this case, if necessary information is acquired in the observation system 100, the communication unit 150 of the observation system 100 transmits the necessary information to the processing device 200. For example, the communication unit 150 may transmit the sensing information from the weather sensor 129 to the processing device 200 or may transmit the result of monitoring the battery voltage to the processing device 200.

Also, whether the various kinds of processing are to be carried out by the observation system 100 or by the processing device 200 may be switched according to the observation mode. For example, in the mode A, since the reduction of electricity consumption is considered important, the processing of setting an observation mode may be carried out not by the observation system 100 but by the processing device 200. Thus, in the observation system 100, the driving of the weather sensor 129, the acquisition of the weather information (information for disaster occurrence estimation), the computation of the remaining electricity information, and the like, need not be carried out and therefore the electricity consumption can be reduced. In this case, the processing device 200 acquires weather information from the Meteorological Agency, for example, then sets an observation mode on the basis of the weather information, and transmits the result of the setting to the observation system 100. In the modes B to D, where the available electricity is greater than in the mode A, the observation system 100 causes the processing unit 140 to carry out the observation mode setting processing.

4.3 Decision on Observation Mode Switching Determination Timing

In the example of FIGS. 9 and 10, an example of deciding the observation mode switching timing on the basis of the information for disaster occurrence estimation (and the remaining electricity information or the like) is described. However, the processing unit 140 may decide the timing of executing the observation mode switching determination on the basis of the information for disaster occurrence estimation.

For example, it is now assumed that a determination result that the probability of disaster occurrence is low for a relatively long period is obtained on the basis of the information for disaster occurrence estimation. In this case, the observation system 100 causes the sensor unit 120, the processing unit 140, and the communication unit 150 to operate in such a way as to reduce the electricity consumption. However, the observation mode switching determination is considered to be executed at a certain frequency. As described above, the observation mode switching determination itself needs the driving of the weather sensor 129 and various kinds of processing such as the computation of the information for disaster occurrence estimation and therefore consumes electricity. That is, if the electricity consumption is to be reduced further, the observation mode switching determination with low necessity should be restrained.

Therefore, in this example, during a period which is determined as having a low probability of disaster occurrence, the observation mode switching determination may be suspended, or the frequency of executing the determination may be reduced. In other words, the timing of executing the next observation mode switching determination is decided, thus skipping the switching determination during the period until that timing. In this way, since it is possible not to execute the determination processing with low necessity, the electricity consumption can be reduced further (in other words, the electricity for the second observation mode can be accumulated).

It is also possible to decide the timing of executing the observation mode switching determination if it is determined that the probability of disaster occurrence is high. The processing of deciding the execution timing of the switching determination can be carried out with various modifications.

Embodiment to which the invention is applied and modifications of the embodiments are described above. However, the invention is not limited to the embodiments and the modifications thereof as they are. In the stage of embodiment, components can be embodied with modifications without departing from the scope of the invention. Also, various inventions can be formed by suitably combining a plurality of components disclosed in the embodiments and modifications. For example, some components may be deleted from the entirety of the components described in the embodiments and modifications. Moreover, components described in different embodiments and modifications may be suitably combined. Also, a term described with a different term with a broader meaning or the same meaning at least once in the specification or drawings can be replaced with the different term at any site in the specification or drawings. Thus, various modifications and applications can be made without departing from the scope of the invention.

The entire disclosure of Japanese Patent Application No. 2016-065224 filed Mar. 29, 2016 is expressly incorporated by reference herein.

What is claimed is:

1. An observation system comprising:
   a power supply unit having a battery;
   a sensor unit which detects a state of a structure based on electricity from the power supply unit;
   a power generator which charges the battery from renewable energy; and
   one or more processors which process sensing information detected by the sensor unit in one observation mode of a plurality of observation modes including at least a first observation mode and a second observation mode in which at least one of a sensor capability of the sensor unit and a load of computational processing using the sensing information from the sensor unit is higher than in the first observation mode,
   wherein the one or more processors acquire information for disaster occurrence estimation and performs control such that the first observation mode is set if it is determined that a probability of disaster occurrence is below a first value based on the information for disaster occurrence estimation that is acquired, whereas the second observation mode is set if it is determined that the probability of disaster occurrence is above a second value that is equal to or above the first value.

2. The observation system according to claim 1, wherein the sensor unit includes a plurality of sensors, and
   the one or more processors enhance the sensor capability by increasing a number of sensors that are made to operate, of the plurality of sensors.

3. The observation system according to claim 1, wherein the one or more processors enhance the sensor capability by increasing an operation rate of a sensor included in the sensor unit.

4. The observation system according to claim 1, further comprising a communication unit capable of reception,
wherein the one or more processors acquire the information for disaster occurrence estimation received by the communication unit.

5. The observation system according to claim 1, wherein the sensor unit includes a weather sensor, and
the one or more processors acquire the information for disaster occurrence estimation by computation based on sensing information from the weather sensor.

6. The observation system according to claim 1, wherein the one or more processors set the observation mode based on the information for disaster occurrence estimation and at least one of history information of the sensing information of the structure from the sensor unit and remaining electricity information of the power supply unit.

7. The observation system according to claim 1, wherein the one or more processors decide at least one of a timing of switching the observation mode and a timing of executing a switching determination on the observation mode, based on the information for disaster occurrence estimation.

8. The observation system according to claim 1, further comprising a communication unit capable of transmission,
wherein the one or more processors set a higher rate of transmission of the sensing information by the communication unit to an outside in the second observation mode than in the first observation mode.

9. The observation system according to claim 1, wherein the sensor unit includes at least two sensors, from among a tilt sensor, a vibration sensor, a water level sensor, and an image pickup sensor.

10. An observation system comprising:
a power supply unit having a plurality of batteries;
a sensor unit which detects a state of a structure based on electricity from the power supply unit;
a power generator which charges at least one battery of the plurality of batteries from renewable energy; and
one or more processors which process sensing information detected by the sensor unit in one observation mode of a plurality of observation modes including at least a first observation mode and a second observation mode in which a battery that is not used in the first observation mode, of the plurality of batteries, is used,
wherein the one or more processors acquire information for disaster occurrence estimation and performs control such that the first observation mode is set if it is determined that a probability of disaster occurrence is below a first value based on the information for disaster occurrence estimation that is acquired, whereas the second observation mode is set if it is determined that the probability of disaster occurrence is above a second value that is equal to or above the first value.

11. The observation system according to claim 10, further comprising a communication unit capable of reception,
wherein the one or more processors acquire the information for disaster occurrence estimation received by the communication unit.

12. The observation system according to claim 10, wherein
the sensor unit includes a weather sensor, and
the one or more processors acquire the information for disaster occurrence estimation by computation based on sensing information from the weather sensor.

13. The observation system according to claim 10, wherein
the one or more processors set the observation mode based on the information for disaster occurrence estimation and at least one of history information of the sensing information of the structure from the sensor unit and remaining electricity information of the power supply unit.

14. The observation system according to claim 10, wherein
the one or more processors decide at least one of a timing of switching the observation mode and a timing of executing a switching determination on the observation mode, based on the information for disaster occurrence estimation.

15. The observation system according to claim 10, further comprising a communication unit capable of transmission,
wherein the one or more processors set a higher rate of transmission of the sensing information by the communication unit to an outside in the second observation mode than in the first observation mode.

16. The observation system according to claim 10, wherein
the sensor unit includes at least two sensors, from among a tilt sensor, a vibration sensor, a water level sensor, and an image pickup sensor.

17. A method for controlling an observation system, the observation system including a power supply unit having a battery, a sensor unit which detects a state of a structure based on electricity from the power supply unit, and a power generator which charges the battery from renewable energy,
the method including at least a first observation mode and a second observation mode in which at least one of a sensor capability of the sensor unit and a load of computational processing using the sensing information from the sensor unit is higher than in the first observation mode, as observation modes,
the method comprising:
acquiring information for disaster occurrence estimation;
setting the first observation mode if it is determined that a probability of disaster occurrence is below a first value based on the information for disaster occurrence estimation that is acquired; and
setting the second observation mode if it is determined that the probability of disaster occurrence is above a second value that is equal to or above the first value.

18. A method for controlling an observation system, the observation system including a power supply unit having a plurality of batteries, a sensor unit which detects a state of a structure based on electricity from the power supply unit, and a power generator which charges at least one battery of the plurality of batteries from renewable energy,
the method including at least a first observation mode and a second observation mode in which a battery that is not used in the first observation mode, of the plurality of batteries, is used, as observation modes,
the method comprising:
acquiring information for disaster occurrence estimation;
setting the first observation mode if it is determined that a probability of disaster occurrence is below a first value based on the information for disaster occurrence estimation that is acquired; and
setting the second observation mode if it is determined that the probability of disaster occurrence is above a second value that is equal to or above the first value.

* * * * *